(12) United States Patent
Schreckenberg

(10) Patent No.: US 9,280,816 B2
(45) Date of Patent: Mar. 8, 2016

(54) ADAPTATION OF A 3D-SURFACE MODEL TO BOUNDARIES OF AN ANATOMICAL STRUCTURE IN A 3D-IMAGE DATA SET

(71) Applicant: TOMTEC IMAGING SYSTEMS GMBH, Unterschleissheim (DE)

(72) Inventor: Marcus Schreckenberg, Freising (DE)

(73) Assignee: TOMTEC IMAGING SYSTEMS GMBH (DE)

( * ) Notice: Subject to any disclaimer, the term of this patent is extended or adjusted under 35 U.S.C. 154(b) by 207 days.

(21) Appl. No.: 13/972,393

(22) Filed: Aug. 21, 2013

(65) Prior Publication Data

US 2014/0055454 A1    Feb. 27, 2014

(30) Foreign Application Priority Data

Aug. 24, 2012  (DE) .......................... 10 2012 107 825

(51) Int. Cl.
| | |
|---|---|
| *G06T 15/00* | (2011.01) |
| *G06T 7/00* | (2006.01) |
| *G06T 7/60* | (2006.01) |

(52) U.S. Cl.
CPC .............. *G06T 7/0012* (2013.01); *G06T 7/602* (2013.01); *G06T 2200/04* (2013.01); *G06T 2207/10072* (2013.01); *G06T 2207/30048* (2013.01)

(58) Field of Classification Search
None
See application file for complete search history.

(56) References Cited

U.S. PATENT DOCUMENTS

| | | | |
|---|---|---|---|
| 5,435,310 A | 7/1995 | Sheehan et al. | |
| 6,106,466 A | 8/2000 | Sheehan et al. | |
| 7,155,042 B1 | 12/2006 | Cowan et al. | |
| 7,526,112 B2* | 4/2009 | Murphy et al. | 382/128 |
| 2003/0038802 A1 | 2/2003 | Johnson et al. | |
| 2005/0033143 A1* | 2/2005 | O'Donnell et al. | 600/407 |
| 2006/0239554 A1* | 10/2006 | Sun et al. | 382/173 |
| 2009/0131788 A1* | 5/2009 | Settlemier et al. | 600/438 |
| 2009/0153548 A1* | 6/2009 | Rabben et al. | 345/419 |
| 2014/0112564 A1* | 4/2014 | Hsiao et al. | 382/131 |

FOREIGN PATENT DOCUMENTS

DE    102005002950 A1    8/2006

* cited by examiner

*Primary Examiner* — Kee M Tung
*Assistant Examiner* — Ryan M Gray
(74) *Attorney, Agent, or Firm* — Cantor Colburn LLP

(57) ABSTRACT

The invention relates to the adaptation of a 3D-surface model to boundaries of an anatomical structure, especially the right ventricle. A first viewing plane is defined corresponding to a default view, especially a four chamber view. A long axis is defined. Then a second, third and optionally a fourth viewing plane are represented intersecting the axis in predefined distances from the starting point and end point thereof. On the viewing planes different markers are represented, controlled and, if required, the position thereof is adapted, especially the position of the intersection points of the axis with the second and third viewing planes, as well as the position of a characteristic line, which together with the end point of the axis spans a characteristic plane of the structure. The 3D-surface model is adapted to the structure by way of the long axis and the position of the characteristic plane.

20 Claims, 3 Drawing Sheets

ADAPTATION OF A 3D-SURFACE MODEL TO BOUNDARIES OF AN ANATOMICAL STRUCTURE IN A 3D-IMAGE DATA SET

TECHNICAL FIELD

The invention relates to a process, a device as well a computer program for the adaptation of a 3D-surface model to boundaries of an anatomical structure in a 3D-image data set. The invention is especially useful for quantitative examination of the inner surfaces of anatomical cavities, especially ventricles, preferably the right ventricle.

BACKGROUND

When measuring the volume of ventricles, especially the right ventricle, the so called disc summation method is currently used as a gold standard. The inner contour of each of the ventricles will thereby be drawn into a stack of magnetic resonance tomography images and each of the volumes will be summed up. However, this method is time consuming and furthermore requires acquisition of costly magnetic resonance tomography (MRT) images. Contrary to that, ultra sound images of the heart, especially three dimensional (3D) or four dimensional (4D) echocardiographic images of the heart, wherein the fourth dimension is the time, are available, considerably easier and more cost effective.

In the established software of the applicant 4D RV-Function® during examination of the right ventricle by the user selection of three sectional planes across the 3D- or 4D-image data set, respectively, i.e. a sagittal plane, a four chamber view and a coronal plane, is required. Onto these images contours of the right ventricle will be drawn, occasionally with the help of the computer, but under the control of a user, and from there a surface model of the right ventricle is spanned, which then in turn will be used for the representation as well as calculation of important parameters of the heart function. The disadvantage with this process however resides in that the user is required to select sectional planes which he is not familiar with, especially the coronal plane. Furthermore in these planes contours of the right ventricle have to be defined. By doing this errors will readily arise, which are not easily realized by the user.

The publications U.S. Pat. No. 6,106,466 and US 2003/0038802 A1 each suggest processes for the adaptation of a surface of a part of a heart. In the process multiple images are acquired with ultra sound imaging in different image planes. In those images a user chooses specified points, i.e. generally at least three land marks, which are located on the surface to be modeled, and a surface model will then be adapted at those points. The disadvantage of this process however resides in that the user has to find the anatomical positions corresponding to the land marks via an appropriate navigation across the acquired ultra sound images, in order to be able to place the land marks. This occasionally may not be easy. Furthermore a corresponding point on the surface model then must be able to be assigned to each of the land marks. I.e. the land marks are a component of the surface model or are located on the surface, respectively. In this approach positioning errors will have a greater impact on the definition of the surface model upon defining the land marks the closer said land marks are located to each other. Ideally the latter will also be chosen such that on the one hand they may be reproducibly detected, but on the other hand will be located maximally spaced apart from each other. Both requirements collectively will strongly limit the selection of useful land marks.

BRIEF SUMMARY

The invention provides a process for the adaptation of a surface model to boundaries of an anatomical structure in an image data set, which does not require navigation which is difficult for a user within the 3D data set, or will facilitate navigation such that no particular training for the application of the process will be necessary, respectively. Moreover error susceptibility is intended to be reduced as well as definition of land marks located on the surface as well as automatically or manual drawing of contours shall be omitted as far as possible.

The process according to the invention serves for the adaptation of a 3D-surface model to boundaries of an anatomical structure in a 3D-image data set, which 3D-image data set contains an image of the structure and was acquired by way of a medical imaging process in an animal or human being. The anatomical structure basically may be any organ having appropriate boundaries, e.g. a kidney, liver, but especially a hollow organ, such as a blood vessel, and especially a ventricle. In the process a three dimensional surface model is adapted to specified boundaries of the anatomical structure, e.g. to the inner or outer surface of a hollow organ, especially to the endocardium of a ventricle, i.e. the boundary between the internal space filled with blood and the ventricular wall.

As described e.g. in US 2003/0038802 A1 the 3D-surface model may be a generic model of the anatomical structure, which typically represents an average model of the anatomical structure of the organs obtained from a number of patients or subjects, respectively. It may also be defined as a wire lattice model, but for example mathematical descriptions, e.g. a spline model, or parametrical definitions of the model are also possible. The invention allows for the so called pose definition, i.e. adaptation of orientation, position and scaling of the defined 3D-surface model to the individual structure, which is represented in the 3D-image data set.

The 3D-image data set may be saved in a data storage, it may be retrieved from a data base or may directly be acquired prior to performing the process, for example with ultra sound, magnetic resonance tomography, PET or X-ray processes, such as CT. The 3D-image data set may be static; it may also be a single heart phase of a dynamic 4D-image data set or a dynamic image data set. By 3D-image data set both a stack of two dimensional (2D) images and a 3D matrix is understood.

According to the invention a first viewing plane is initially defined by the 3D-image data set, which corresponds to an easily detectable default view of the anatomical structure, in the case of the heart e.g. a four chamber view. The orientation of the first viewing plane may either be performed automatically by a computer knowing for example the rough orientation of the anatomical structure in the image data set and which finds the default view by way of predefined features of the anatomical structure. Preferably the first viewing plane will however be defined by a user navigating across the data set, who especially will displace or rotate a sectional plane until it shows the default view. It is preferred that the first viewing plane will then be represented for the sake of control by the user.

Displacement of a viewing plane across a 3D-image data set is also called 'navigation' and generally requires great experience of the user, unless a default view such as for example the four chamber view in the heart is intended to be selected.

In the next step an axis across the anatomical structure is defined by way of positioning two markers on the first viewing plane marking starting point and endpoint of the axis. Definition of those markers in turn may be performed automatically or by a user, which for example chooses two points on the represented first viewing plane with the help of an input device, such as for example a mouse.

Following definition of the axis at least a second and a third and optionally a fourth viewing plane is represented intersecting the axis in predefined distances from the starting point and endpoint thereof, wherein the distance may also be 0. If the axis corresponds to a long axis across the anatomical structure, short axis sections will automatically be chosen and will be represented. The predefined distances are chosen such that characteristic features of the anatomical structure are represented on the viewing planes (see below).

In the representation of a viewing plane the following will be performed: a plane is placed across the 3D-image data set either automatically or by a user by way of appropriate navigation means, i.e. the angular orientation thereof will be defined. Subsequently voxels within the 3D-image data set which are located on this plane or which will be nearest to it, respectively, will automatically be searched by a computer. For this, interpolation techniques may also be used. An image will thus be generated corresponding to a sectional plane across the 3D-image data set along this plane. This 2D image is referred to as a viewing plane and may be represented on a screen.

These additional viewing planes in turn serve the representation of specified markers, the positions of which on these viewing planes may be controlled and, if required, may be adapted. Between the markers, the axis and the different viewing planes there preferably exist predefined angular relations and occasionally distance conditions, which will automatically be maintained in each adaptation of the position of a marker. Especially the markers for following items will be represented on the viewing planes and, if required, will be adapted:

- the position of the intersection point of the axis with the second viewing plane on the representation of the second viewing plane,
- the position of the intersection point of the axis with the third viewing plane on the representation of the third viewing plane,
- optionally the positions of the intersection lines of the second, third and occasionally of the fourth viewing plane with the first viewing plane on the first viewing plane;
- optionally the position of the intersection line of the first plane to at least one of the second, third or fourth viewing planes on that viewing plane, and
- the position of a characteristic line on at least one of the second, third or fourth viewing planes, which together with the end point of the axis spans a characteristic plane of the structure, wherein the second, third and occasionally the fourth viewing plane are oriented to the characteristic plane in a predefined angle, and wherein that predefined angle in each adaptation will automatically be maintained by modification of the position(s) and orientation(s) of each of the respective viewing plane(s) or the characteristic plane, respectively.

The process thus allows definition and occasionally correction of an axis and of a characteristic plane across the anatomical structure. The viewing planes are chosen such that the user or a computer may readily control if the starting point and the end point of the axis as well as the characteristic plane are properly localized or oriented, respectively.

Following control and occasionally adaptations the 3D-surface model may subsequently be adapted to the structure. It is preferred that the length of the axis will be used as a measure for dimensional scaling, the center of the axis defines the position. Finally, via the position of the characteristic plane and the direction of the axis rotation of the 3D-surface model is set. It is preferred that in the adaptation of the 3D-surface model also a spatial transformation with seven degrees of freedom will be deduced: 3D-translation, 3D-rotation and scaling. A pose definition may thereby be performed. Subsequently the—so far rigid—surface model may also be adapted in its shape to the boundary of the individual anatomical structure which is represented, for example by methods as described in US-2003/0038802 A1 or U.S. Pat. No. 6,106,466. This shape adaptation however is not part of this invention, as is the pose definition.

The process according to the invention is performed e.g. on a device according to the invention described below, which may be a commercially available computer, work station or another computer. It is preferred that capability of simultaneous representation of multiple viewing planes, e.g. on a screen or through a projector, should be available. Moreover it is preferred to provide an input device, e.g. a computer mouse and/or a key board, enabling a user to perform interactions, especially for the adaptation of markers on the viewing planes.

Accordingly, according to a first embodiment, control and occasionally adaptation of the positions of said markers is performed by a user. According to a second embodiment this may however be performed automatically or semi-automatically via the calculator or computer, respectively. In an automatic process the computer would detect specified distinctive features within the 3D-image data set, e.g. the endocardium, or the boundary between the internal space and the heart wall of the ventricle to be modeled, or specified heart valves, respectively, and with this would perform orientation of the axis and the characteristic plane. In semi-automatic processes at least two approaches are conceivable: Either the computer initially suggests a position or orientation of the different markers, respectively, and this will be controlled by the user and occasionally will additionally be adapted. Or the user roughly defines the position of the marker, and the computer will subsequently perform fine tuning. This is true both for the adaptations in step e), and the definition of the axis by way of positioning of starting point and end point on the first viewing plane, as well as positioning of the first viewing plane.

It is preferred that the first to third and occasionally fourth viewing planes will simultaneously be represented, so that control and occasionally adaptation of the markers may be performed iteratively. In other words adaptation of markers on a viewing plane, e.g. the displacement of the characteristic line, according to the invention, in turn leads to a displacement of the second and third viewing plane, since these are present on the characteristic plane in a predefined angle. Preferably representation of this viewing plane then will be automatically adapted, including the intersection points of the axis with those planes represented thereon, whereupon the computer or the user in turn may control and occasionally may adapt the position of these intersection points.

Depending on the organ, which is represented by the anatomical structure to be modeled, the characteristic plane may be a plane of symmetry of the structure, e.g. of the kidney or a ventricle. Especially the right ventricle has a plane of symmetry which however is not parallel to its long axis, as it will be described in detail below. In this case the characteristic line is also called line of symmetry. Depending on the embodiment it may be represented on and adapted to the second, third or fourth viewing plane, or on two or three of these viewing planes. In preferred embodiments a position of the characteristic line is initially be predefined via the computer, mostly or always requiring subsequent adaptation.

Especially if the characteristic plane is a plane of symmetry of the structure, upon representation and control of the position of the characteristic line, it is advantageous, to mirror the image contents on one side and on the side located opposite of the line to superimposedly represent it with the local image contents. This may be done in different ways, e.g. by way of partially transparent blending the two image contents and superimposing, e.g. in addition by way of different coloring of the image contents on the opposite side and of the mirrored image contents. Such representations are known for the visualization of image registrations. Accordingly the adaptations of a line of symmetry may then also be performed automatically or semi-automatically by image registration processes wherein the mirrored image contents are compared to those on the opposite side and the line of symmetry is displaced such that there will be maximal coincidences.

As already set forth above it is advantageous to use the invention for the right ventricle, wherein the surface model is adapted to the inner surface or the endocardium of this chamber, respectively. The process may however also be useful for the right or left atrium, the right ventricle or a large vessel, such as the aorta.

The predefined angle, which is established by the second, third and occasionally fourth viewing plane with the characteristic plane, preferably is between 70° and 110°, especially preferred between 80° and 100°, especially 90°. In that the viewing planes 2 to 4 are always perpendicular to the characteristic plane (in the case of the right ventricle preferably the plane of symmetry) it is assured that the represented short axis views of the ventricle are as optimal as possible, wherein in turn the marker to be refined may be adapted with greater ease without errors.

According to a preferred embodiment the second, third and occasionally fourth viewing plane are not only located in a predefined angle on the characteristic plane, but also their intersection lines with the first viewing plane have a predefined angle in relation to the axis. The predefined angle preferably is between 70° and 110°, more preferably between 80° and 100°, even more preferably 90°. The latter does not necessarily mean that the viewing planes are perpendicular to the axis. Also this predefined angle shall then be automatically maintained in each adaptation, i.e. if the axis on the first viewing plane is displaced, orientation of the second, third and occasionally fourth viewing plane also changes.

According to another embodiment it is also conceivable that it solely is to be defined that the second, third and occasionally fourth viewing plane each have to be oriented parallel to each other. In this case it is reasonable, that in the first representation of these viewing planes the computer performs orientation of the intersection lines for the axis in a specified angle, e.g. perpendicular, and that subsequently the program or the user may modify this initial angle, wherein the angle of all planes changes simultaneously.

Taken as a whole the interdependence described herein of the positions and orientations of the planes means, that the characteristic plane essentially defines the orientation of the second, third and occasionally fourth viewing plane and that the position and length of the axis then in turn will define the position and angle of rotation of the second, third and occasionally fourth viewing plane in relation to the characteristic plane.

The starting point of the different axes and viewing planes is the first viewing plane, which in the case of the heart or the right ventricle, respectively, preferably represents the so called four chamber view. In cardiology this is the most common default view which by someone skilled in the art may generally be safely detected. For this reason preferably orientation of the first viewing plane in the 3D-image data set is adaptable by the user with the help of an input device, e.g. by way of lateral displacement, zooming, rotation, pivoting about the center etc. In other words the first viewing plane is preferably provided with navigation options.

In the case of the right ventricle the axis preferably represents a connecting line between the apex and the tricuspidal valve, wherein the marker for the starting point of the axis is positioned close to, especially on the height and as far as possible at the center of the tricuspidal valve. The marker at the end point of the axis is positioned close to or at the apex, respectively. Alternatively some distance to the apex could intentionally be left, in order to obtain most suitable image contents in the second, third and occasionally fourth viewing plane for adjusting the axis of symmetry.

Following definition of the axis on the first viewing plane, according to the invention, at least a second, third and optionally fourth viewing plane will be represented, intersecting the axis in predefined distances or distance conditions, respectively, from the starting point and endpoint thereof, wherein the distance may also be 0. In the case of the right ventricle in a preferred embodiment provision is made that the second viewing plane intersects the axis at the starting point thereof, or in a low distance therefrom (e.g. some millimeters or <1/15 of the length of the axis, respectively). The second viewing plane may then be used for the orientation of the starting point of the axis as close as possible at the desired position near the tricuspidal valve.

The third viewing plane intersects the axis slightly above its end point, preferably spaced apart from the end point by 1/8 to 1/4 of the length of the axis, especially preferred about 1/5 of the length of the axis. This viewing plane functions for positioning the end point of the axis close to the apex. The positioning of the third viewing plane exactly on the apex itself will thus not be reasonable, but slightly displaced in the direction of the tricuspidal valve, in order to allow better representation of the right ventricular wall since in this range the cross sectional area of the sectioned blood volume of the right ventricle, which is between the right ventricular free wall and the septum, is slightly larger.

The fourth viewing plane which occasionally is present intersects the axis preferably at a point between the second and third viewing plane, preferably spaced apart from the starting point or the second viewing plane, respectively, by 1/8 to 1/4, especially 1/5, of the length of the axis. Preferably the characteristic line is represented and adapted to this fourth viewing plane. It is however also possible, to represent and adapt the characteristic line to the second or third viewing plane whereby the fourth viewing plane is no longer required and may be omitted.

In some embodiments the distances or the distance relations, respectively, of the viewing planes 2 to 4 on the axis are fixedly defined. In other embodiments the distances are solely defined at the beginning and may subsequently be adapted by the computer or manually by the user. In other words the viewing planes 2 to 4 may be displaced along the axis.

The invention also relates to a computer program, which causes a calculator or a computer to perform the process according to the invention. In the case of the user interactions mentioned above this means, that the computer represents the respective viewing planes including said markers, and that for the user it provides the possibility or the functionality, respectively, to displace said markers on the viewing planes, via an input device, such as for example a mouse, thus automatically modifying the position and orientation of the residual viewing planes or the axis and the characteristic plane, respectively.

Moreover the invention also relates to a suitable device for the adaptation of a 3D-surface model of an anatomical structure to a 3D-image data set. The device may be a regular computer, a work station or any computer, especially also the panel of a medical imaging apparatus, e.g. of an ultra sound apparatus, MRT or CT-apparatus. The device has a data storage, wherein an appropriate 3D-image data set is saved. The data storage however may also be "remotely" arranged, so that the image data set are downloaded via a data link, e.g. internet or network connectivity, from a server. Moreover a reproducing device is present which is configured for the simultaneous representation of multiple viewing planes by the 3D-image data set. It is preferably a screen, alternatively a projector, occasionally including a screen etc. The reproducing device enables a user at least to control the positions of said markers on the viewing planes. In preferred embodiments possible adaptation by the user is provided, especially via an input device. In other embodiments control and adaptation of the position of the markers will however be done automatically, in still other embodiments semi-automatically, as described above.

The steps of definition and representation of a first viewing plane according to the invention, including the markers of the axis, as well as selection and representation of the viewing planes 2-4 and said markers, is performed by a calculator unit of the device. It may be a processor, especially a CPU of a local computer, of a server and/or any computer or mobile device. The calculator unit also automatically performs adaptation of the 3D-surface model by way of the length and orientation of the axis as well as the position of the characteristic planes, as described above.

The device or the calculator unit thereof, respectively, according to preferred embodiments is configured such that it is suitable for performing the process described above. To circumvent redundancies repeated description is omitted. All features of the subclaims described herein concerning the process also apply to the device.

BRIEF DESCRIPTION OF THE DRAWINGS

The invention will now be described in detail by way of preferred embodiments wherein reference is made to the accompanying figures wherein.

DETAILED DESCRIPTION

Figure 1:
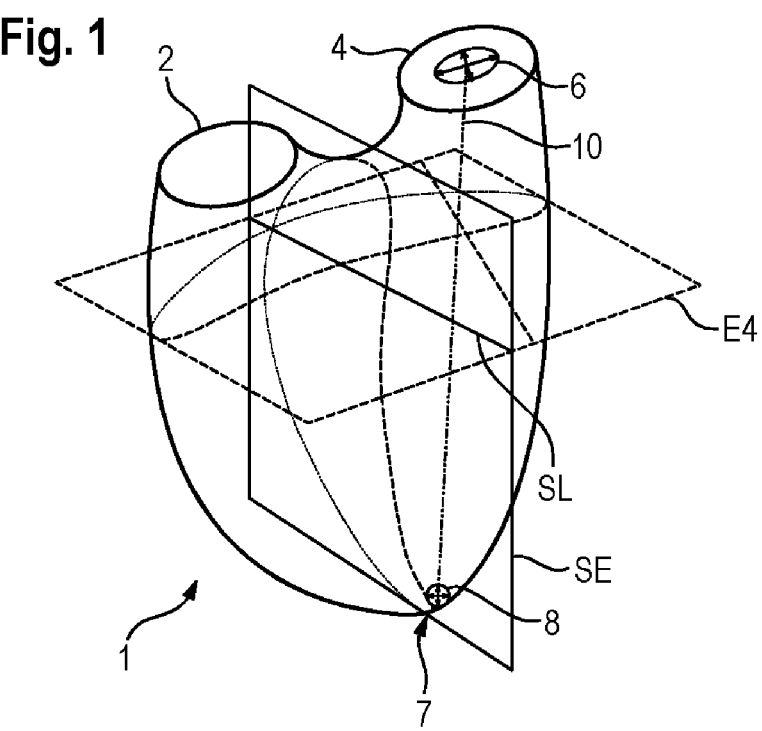
FIG. 1 is a schematic perspective drawing of a right ventricle, including plane of symmetry, axis and a viewing plane.

For the sake of improved orientation FIG. 1 shows a schematic drawing of a right ventricle 1. The latter generally is nestled to the larger left ventricle thus showing a relatively complex bag-like shape. The pulmonic valve 2 and the tricuspidal valve 4 can be seen basally, the apex which is referred to as 7 can be seen apically. The right ventricle 1 approximately is mirror-symmetrically arranged about the plane of symmetry SE. This plane of symmetry SE thus shall preferably be defined by the process according to the invention, since the surface model may be oriented in relation to it. Initially the axis 10 is defined, which extends between the tricuspidal valve (TV) 4 and the apex 7. The axis 10 is depicted as a dot-dashed line. The tricuspidal valve 4 is marked by the TV marker 6, marking the starting point of the axis. At the apex another marker 8 is defined, i.e. the apex marker.

Furthermore in FIG. 1 one of the viewing planes, herein the fourth viewing plane E4, is depicted. It has an intersection line SL with the plane of symmetry, the line SL corresponding to the line of symmetry or the characteristic line, respectively. This line may then be represented on and occasionally be adapted to that viewing plane E4 and together with the apex marker 8 defines the orientation of the plane of symmetry SE.

Figure 2:
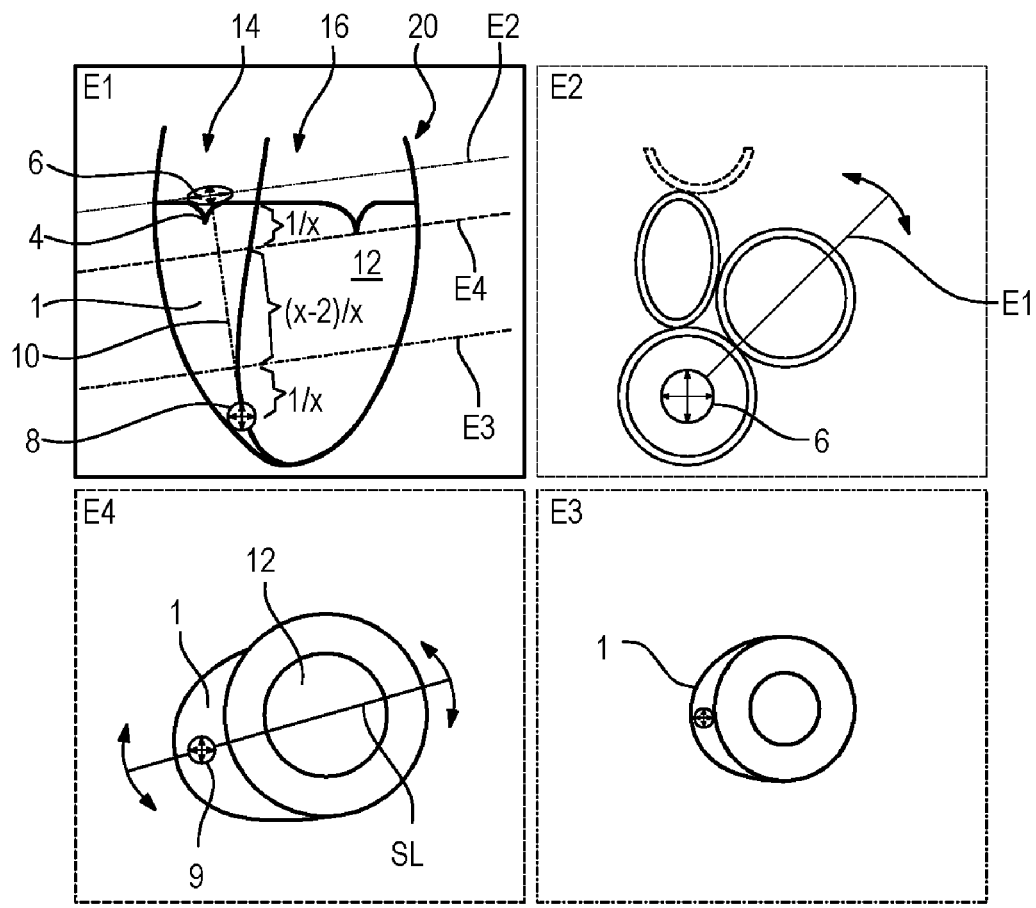
FIG. 2 is an appropriate user interface showing the viewing planes 1-4.

FIG. 2 shows a view as it is represented in preferred embodiments on the screen of a device according to the invention or another viewing device. It is preferably the user interface of a computer program which implements the invention, and by way of which the first to fourth viewing planes E1, E2, E3 and E4 are simultaneously represented, wherein in other embodiments the fourth viewing plane E4 may be omitted.

The viewing plane E1 initially is defined by the 3D-image data set, so that it shows a four chamber view through the heart 20. In an ultra sound image the heart wall should be distinct of each of the blood filled inner spaces of the chambers. Accordingly in this representation the left ventricle 12, the left atrium 16, the right ventricle 1 and der right atrium 14 can be seen. Between atrium 14 and ventricle 1 the tricuspidal valve 4 extends. The long axis 10 of the right ventricle is subsequently defined with the two markers 6 and 8. This may either be done automatically, semi-automatically or by the user, in any case the user has the possibility to control the position of the markers 6 and 8 and preferably to adapt the position thereof.

Following definition of axis 10 (preliminary), the intersection lines of the planes E2, E3 and occasionally E4 automatically arise on the viewing plane E1. Moreover the appropriate viewing planes E2, E3 and E4 are displayed on the screen adjacent to or below E1, respectively. In the example which is shown the intersection lines of said planes on the first viewing plane E1 at least initially have a right angle to the axis 10, and the distances of the planes among each other are in the relations set forth in the drawing. In the example shown x=5, however other values such as 3, 4, 6, 7, 8 or 9 are also applicable. In the example which is shown E2 is located at the level of the tricuspidal valve TV, thus extending directly across the marker 6. Plane E3 is located slightly above the right-ventricular apex, i.e. is displaced by ⅕ of the length of the axis in the TV direction. As it clearly can be seen on the viewing plane E3, this is advantageous, since the intersection point 9 of the axis 10 with the plane E3 is located in the sectioned blood volume, allowing more precise positioning of the lower region of the axis. In the region of the plane E3 the cross sectional area of the sectioned blood volume of the right ventricle between the right-ventricular free wall and the muscle wall between the left and right ventricle is slightly larger than directly at the apex.

On the plane E2 the position of the marker 6 for the tricuspidal valve can still easily be adapted. Also optionally, the intersection line of the plane E1 with E2 on the viewing plane E2 is displayed, as it is represented on the viewing plane E2. In order to further optimize the four chamber view, orientation of the plane E1 from the representation of E2 may thus be adapted by way of manual or automatic rotation of the intersection.

Thus plane E3 is utilized to adapt the apical intersection point of the axis within this plane, accordingly plane E2 is for adaptation of the basal intersection points. In this way the axis may randomly be positioned.

The plane E4 in turn is spaced apart from the starting point or the TV marker 6, respectively, by ⅕ of the length of the axis. In the plane E4 the user is intended to adapt the position of a line of symmetry SL. The plane of symmetry SE per se subsequently will be defined in that it includes the line of symmetry SL and extends across the apical definition 8 of the axis.

Upon modification of the line of symmetry SL orientation of the viewing planes E2, E3 and E4 also changes, since the latter have a defined angle, especially 90°, in relation to the plane of symmetry. It is thereby assured that solely short axis views of the right ventricle which are as optimal as possible are represented in the viewing planes E2-E4 wherein the markers which have to be positioned in this planes may easily be adapted.

Figure 3:
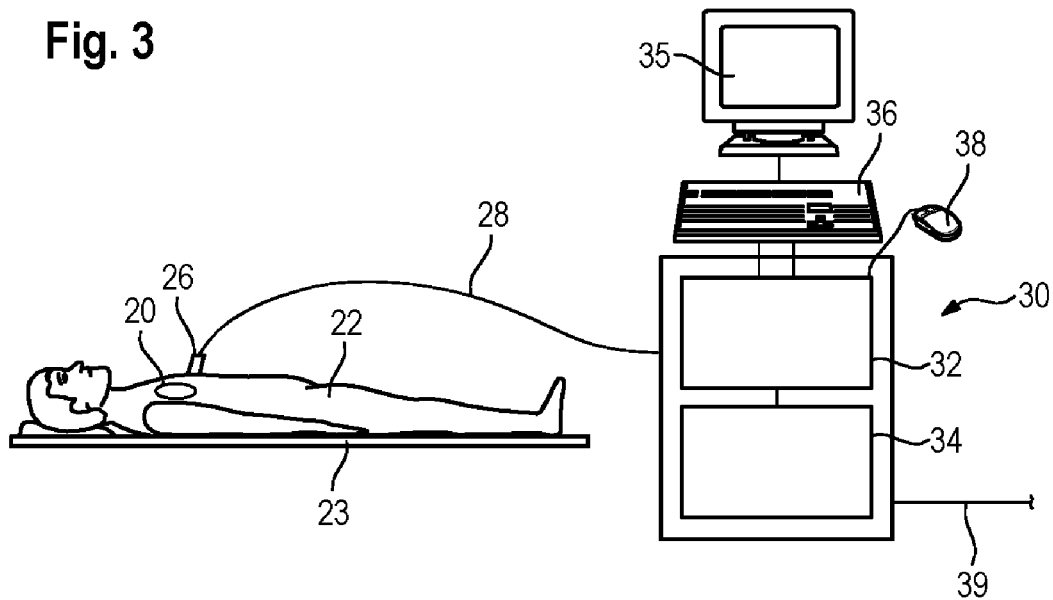
FIG. 3 is an executive example of a device according to the invention.

FIG. 3 shows a device according to the invention. The process according to the invention may be performed on any computer, it may however also be the panel 30 of an ultra sound apparatus, as schematically represented in FIG. 3. For the acquisition of a 3D-image data set by way of ultra sound a patient 22 is lying on a couch 23. By way of the ultra sound probe 26 ultra sound images of the heart 20 are acquired, especially greylevel images. This may for example be done by acquisition of multiple 2D planes the relative position of which and orientation towards each other id recorded, and which are assembled into a 3D-image data set. 3D or 4D-acquisition is also conceivable. The data are transmitted to the panel 30 via data bus 28. Panel 30 among others has a processor 32, which performs the jobs of the calculator unit according to the invention. The processor 32 is connected to a data storage 34 as well as a screen 35, a keyboard 36 and a mouse 38, wherein both or either of them may function as an input device. Optionally a network connection 39 may be present, by way of which for example the 3D-image data set may also be loaded on the computer 30.

Figure 4:
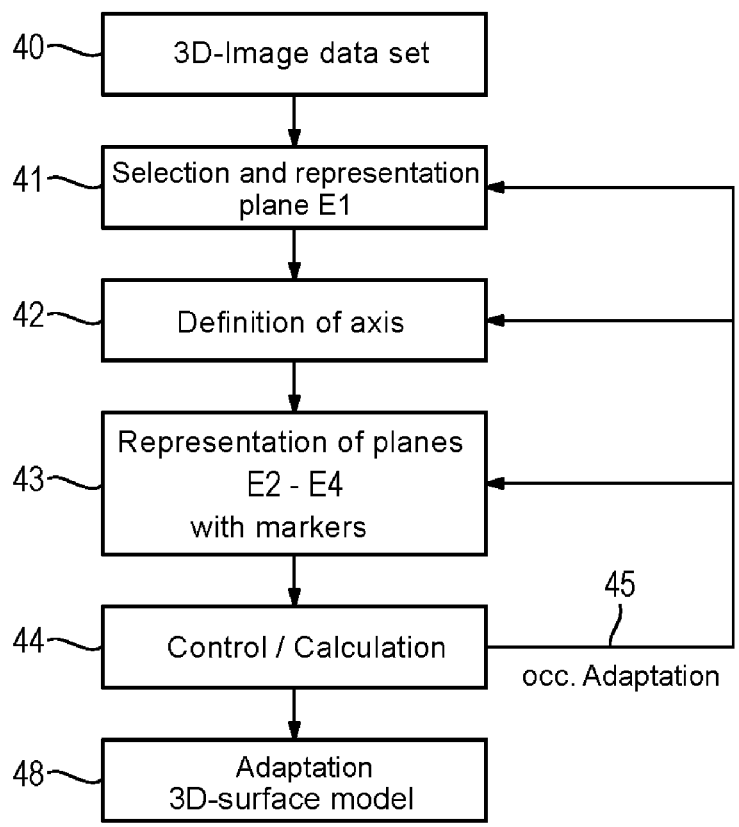
FIG. 4 is a flow diagram of an executive example of the process according to the invention.

FIG. 4 shows a flow diagram of the process according to the invention. Initially in step 40 a 3D-image data set is provided by way of which in step 41 the first viewing plane E1 is chosen—automatically or by the user—and is represented. In step 42 the axis is defined by the definition of the markers 6 and 8. The definition of the axis in turn triggers the representation of the viewing planes E2-E4 intersecting the axis in defined distances and in a preliminary angle, including the markers according to the invention.

In step 44 the positions or orientations, respectively, of these markers are controlled, either visually by a user, or by calculations via the computer. If this seems to be necessary, occasionally an adaptation 45 is made, which may relate both to the orientation of the viewing plane E1 (step 41), the markers for the axis (step 42), and the markers represented on the viewing planes E2-E4, especially the characteristic line, (step 43). If for example the position of the viewing plane E1 was modified, consequently the position of the axis 10 and thus that of the viewing planes E2-E4 also changes, so that the steps 42-43 as such will repeatedly be run. Following this there may be another control 44, and occasionally an another adaptation 45. The process preferably is also iterative, wherein about two to maximally ten different adaptations or runs, respectively, should be sufficient.

As soon as a suitable length and orientation of the axis 10 as well as orientation of the characteristic plane SE has been defined, finally in step 48 the 3D-surface model is adapted to the anatomical structure, which preferably is equal to a rigid 3D transformation.

Thus the process suggested herein solves the problem by way of combining navigation and pose definition, making user interaction more rapid and safer—as far as it is provided. The definition of the pose is thus made by direct combination with the navigation across the 3D-image data set (i.e. orientation of specified viewing planes). In this way both error susceptibility and input expenditure will be minimized in comparison to the described prior art.

The process described herein avoids direct specification of land marks. Instead, the spatial position of the anatomical structure is defined by placing specified viewing planes and axes on these planes which have already been defined by the user by way of the navigation. On the one hand, by appropriate (angle) coupling of these planes and axes, sectional images which may easily be interpreted by the user, or viewing planes, respectively, are generated, and on the other hand definition of land marks, at least of such land marks, which then are to become part of the surface model which may be handled, may be omitted.

An essential portion of the orientation will be solved by way of the definition of a characteristic plane, especially a plane of symmetry. This orientation explicitly avoids definition of land marks, allowing e.g. also user support by way of semitransparent cross-fade of the images mirrored at the plane, or plane definition automated by way of image registration techniques, respectively.

The invention claimed is:
1. A process for adaptation of a 3D-surface model to boundaries of an anatomical structure in a 3D-image data set, comprising the following steps:
   a. providing a 3D-image data set, comprising an image of the anatomical structure and acquired by way of a medical imaging process in an animal or human being;
   b. defining of a first viewing plane by way of the 3D-image data set, corresponding to an easily detectable default view of the anatomical structure, and representation of the first viewing plane;
   c. defining of an axis across the anatomical structure by positioning two markers, marking the starting point and the end point of the axis on the first viewing plane;
   d. representing at least a second and a third and optionally a fourth viewing plane, intersecting the axis in predefined distances from the starting point and end point thereof, wherein the distance may also be zero;
   e. representing and controlling as well as, if required, adaptation of the position of a characteristic line on at least one of the second, third or fourth viewing planes, which together with the end point of the axis spans a characteristic plane of the structure, wherein the second, third and occasionally forth viewing plane are arranged in a predefined angle on the characteristic plane, and wherein this predefined angle will automatically be maintained in each adaptation by way of modification of the position(s) and orientation(s) of each of the affected viewing plane(s) or the characteristic plane, respectively; and;
   f. Adapting the 3D-surface model to the structure by way of the length and orientation of the axis as well as the position of the characteristic plane.
2. The process according to claim 1, wherein adaptation of the 3D-surface model is performed by way of 3D-translation, 3D Rotation and scaling.

3. The process according to claim 1, wherein control and occasionally adaptation of the position of the markers in step e is performed automatically or semi-automatically.

4. The process according to claim 1, wherein control and occasionally adaptation of the position of the markers is performed by a user.

5. The process according to claim 1, wherein the first to third and, if present, the forth viewing plane (E1-E4) are represented simultaneously, so that control and occasionally adaptation of the markers may be done iteratively.

6. The process according to claim 1, wherein the characteristic plane is a plane of symmetry of the structure.

7. The process according to claim 1, wherein in the representation and control of the position of the characteristic line the image contents is represented mirrored on one side of the characteristic line and on the opposite side of the line is represented superimposed with the local image contents.

8. The process according to claim 1, wherein the anatomical structure is a ventricle, especially the right ventricle.

9. The process according to claim 1, wherein the intersection lines of the second and third viewing planesand occasionally of the fourth viewing plane with the first viewing plane are in a predefined angle to the axis and wherein this predefined angle in each adaptation is automatically maintained by way of modification of the position(s) and orientation(s) of each of the affected viewing plane(s).

10. The process according to , claim 1 wherein the orientation of the first viewing plane in the 3D-image data set is adaptable by the user with the help of an input device.

11. The process according to claim 1, wherein the anatomical structure is the right ventricle, and wherein the axis represents a connecting line between apex and tricuspidal valve, wherein the marker for the starting point of the axis is positioned close to the tricuspidal valve and the marker for the end point of the axis is positioned close to the apex.

12. The process according to claim 11, wherein
the second viewing plane intersects the axis at its starting point,
the third viewing plane intersects the axis slightly above its end point, preferably spaced apart from the end point by ⅛ to ¼ of the length of the axis;
forth viewing plane, if present, intersects the axis between the second and of the third viewing plane, spaced apart from the starting point by ⅛ to ¼ of the length of the axis.

13. The process according to claim 11, wherein the first viewing plane represents a four chamber view and the characteristic plane is a plane of symmetry of the ventricle and is represented on and adaptable to the third or fourth viewing plane.

14. The process according to claim 1, wherein step e comprises representing and controlling as well as, if required, adaptation of the positions of at least two of the following:
the position of the intersection point of the axis to the second viewing plane on the representation of the second viewing plane,
the position of the intersection point of the axis to the third viewing plane on the representation of the third viewing plane,
the positions of the intersection lines of the second, third and occasionally fourth viewing plane with the first viewing plane on the first viewing plane;
the position of the intersection line of the first plane with at least one of the second, third or fourth viewing planes on the same.

15. The method according to claim 1, wherein the anatomical structure is the right ventricle of the heart.

16. A non-transitory computer readable medium having stored thereon executable programming instructions for preforming the method of claim 1 when said programming instructions stored on the non-transitory computer readable medium are executed on a computer.

17. A device for the adaptation of a 3D-surface model of an anatomical structure to a 3D-image data set, which is especially configured for performing the process according to claim 1, comprising:
a data storage, wherein a 3D-image data set is saved, containing an image of the anatomical structure and which was acquired by way of a medical imaging process in an animal or a human being;
a reproducing device, which is configured for the simultaneous representation of multiple viewing planes by the 3D-image data set,
a calculator unit, which is configured for performing the following steps:
definition and representation of a first viewing plane by the 3D-image data set, which corresponds to an easily detectable default view of the anatomical structure on the reproducing device, and representation of an axis across the structure by the positioning of two markers, marking the starting point and the end point on the first viewing plane;
representation of at least a second and a third and optionally of a fourth viewing plane, intersecting the axis in predefined distances from the starting point and endpoint thereof, wherein the distance may also be zero;
representation and, if required, adaptation of the positions of the following, wherein an adaptation and occasionally an adaptation of the position may be performed automatically, semi-automatically or by a user:
the position of a characteristic line on at least one of the second, third or fourth viewing planes, which together with the end point of the axis spans a characteristic plane of the structure, wherein the second, third and occasionally forth viewing plane is present in a predefined angle on the characteristic plane, and wherein this predefined angle in each adaptation is automatically maintained by modification of the position(s) and orientation(s) of each of the affected viewing plane(s) or the characteristic plane, respectively; and
adaptation of the 3D-surface model to the structure by way of the length and orientation of the axis as well as the position of the characteristic plane.

18. The device according to claim 17, furthermore comprising an input device, which is configured such that the user is allowed to adapt the positions of the markers on the representations of the viewing planes.

19. The device according to claim 18, wherein the input device is configured such that the user is allowed to displace or to rotate the positions of the markers on the representations of the viewing planes.

20. The device according to claim 17, wherein the calculator unit is configure for performing the representation and, if required, adaptation of the positions of at least two of the following, wherein an adaptation and occasionally an adaptation of the positions may be performed automatically, semi-automatically or by a user:
the position of the intersection point of the axis to the second viewing plane on the representation of the second viewing plane, the position of the intersection point of the axis to the third viewing plane on the representation of the third viewing plane, the positions of the intersection lines of the second, third and occasionally fourth viewing plane with the first viewing plane on the first viewing plane, the position of the intersection line of the first plane with at least one of the second, third or fourth viewing planes on the same.

\* \* \* \* \*